3,327,036
METHOD OF MANUFACTURING A CATHODE RAY TUBE WITH A RIGID COLLAR
Antonius Johannes Gerardus Bakkes, Emmasingel, Eindhoven, Netherlands, assignor to North American Philips Company, Inc., New York, N.Y., a corporation of Delaware
Filed Sept. 8, 1964, Ser. No. 395,091
Claims priority, application Netherlands, Sept. 6, 1963, 297,617
3 Claims. (Cl. 264—128)

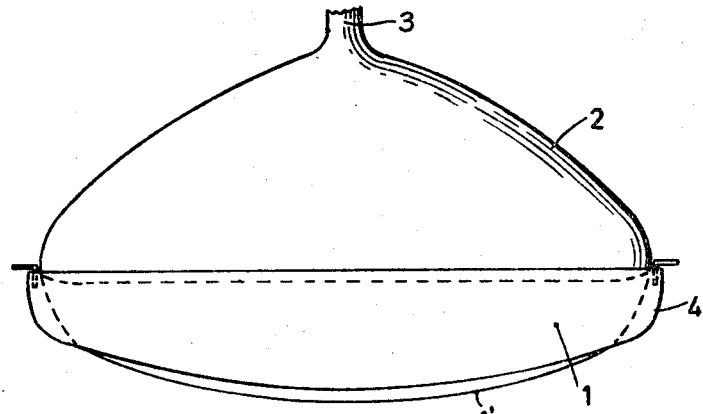
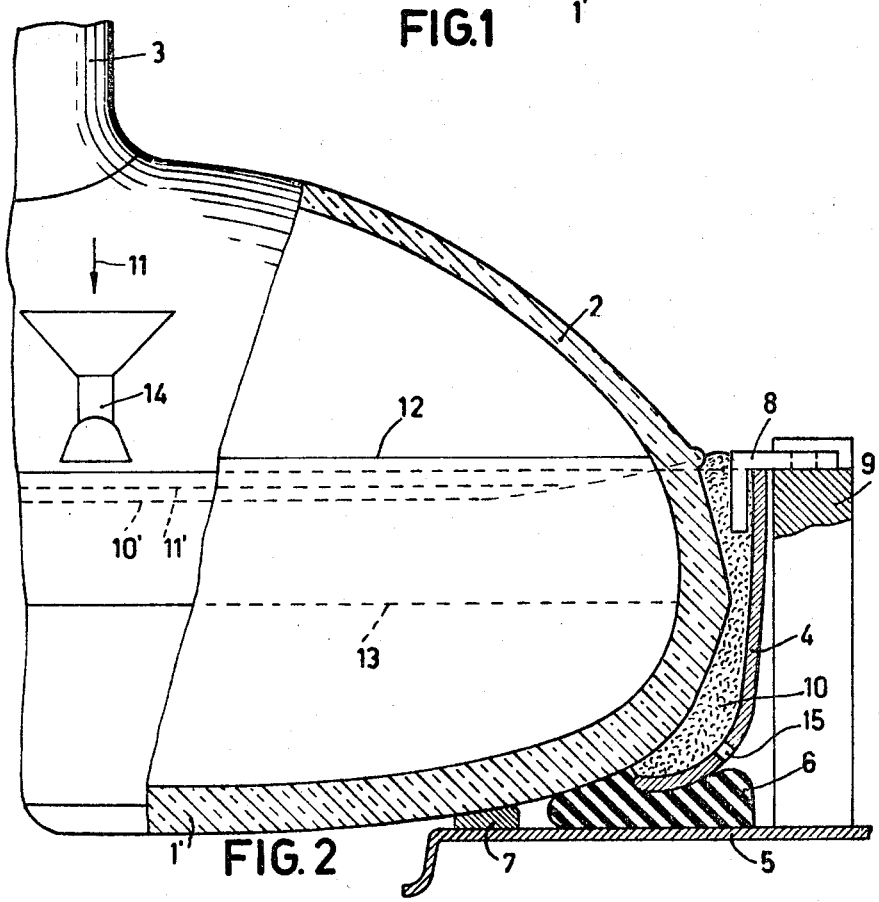

This invention relates to a method of manufacturing an implosion resistant tube and in particular to filling the space between the collar and the bulb of a cathode-ray tube with a filler containing a hard granular substance.

It has been previously suggested to arrange a rigid collar, preferably of metal, around that portion of the bulb which adjoins the image field and which possibly extends over part of the cone, and to fill the space between the bulb and the collar with a filler which hardens, preferably a hardenable synthetic material. It was then always necessary also to cover the cone itself with a tissue preferably consisting of glass and impregnated with such a hardenable synthetic material. It has now been found that such covering of the cone may be omitted if the filler between the collar and the bulb contains a hard granular substance such as sand.

A difficulty then involved is that the filler, if previously mixed with the granular substance, acquires such a high viscosity that it can be introduced into the space between the bulb and the collar only with difficulty. If the filler is diluted with a diluting agent which has to be evaporated afterwards, then the disadvantage arises that the bulb has to be heated to enhance the evaporation process, while there is also the risk of a non-controllable formation of vapor bubbles occurring in the filling.

These disadvantages are completely avoided if, according to the invention, a dry granular and hard solid substance and a pourable hardenable filler are separately introduced into the space between the bulb and the collar so that the granular substance is impregnated with the hardening filler. The granular substance is preferably sand having a grain size between 200 microns and 400 microns and the pourable filler is a hardenable synthetic material. It is possible first to pour the granular substance into the space between the bulb and the collar and then the filler. The synthetic material is then found to be sucked up by the granular substance due to capillary action, thus pushing in front of it the air present between the grains. This process may be enhanced by providing the collar at its underside, that is to say, at the side which is adjacent to the image field, with several apertures through which any excessive pourable material can also flow away. It is alternatively possible to increase the level of the granular substance near the corner points of the collar, which is usually rectangular. The pourable substance is poured between the corner points onto the granular substance and expands in the granular substance whereby the air can escape at the corner points. Lastly, the pourable substance is sucked up at the corners, likewise due to capillary action, to the upper side of the granular filler. In this method the bulb with its collar is placed in a vertical position with the image field below.

However, it is also possible, first to pour a given quantity of hardenable filler into the space between the bulb and the collar and then the granular material, in which event it is necessary to obtain a satisfactory degree of filling of the granular material by vibrating it.

The invention will now be described with reference to the accompanying drawing, in which:

FIGURE 1 shows a cathode-ray tube in accordance with the invention, and

FIGURE 2 is a sectional view of part of such a cathode-ray tube.

The cathode-ray tube shown in FIGURES 1 and 2 has a glass bulb comprising a window 1, a cone 2 and a neck 3. A metal collar 4 is arranged with some clearance around, the widest portion of the bulb which adjoins the image field 1'.

The collar 4, which has the form of a profiled annulus, is placed in a mold 5 with its edge on a rubber ring 6. Then the bulb is placed in the collar 4, with its window below and pulled downwards by means of a vacuum suction device until the window bears on spacers 7. The rubber ring 6 thus completely closes the gap between the collar and the surface of the window. Next, loose lugs 8 are placed on holders 9 and over the edges of the corners of the collar.

The space between the collar and the bulb is now filled with dry sand 10 up to approximately 5 mms. below the upper edge of the collar. The level of the sand layer is increased at the corners as shown by the broken line 10'; in order to facilitate the fastening of the lugs 8 which are held solely by the filler to be provided between the bulb and the collar.

Next, by means of funnels 14, a fluid hardenable synthetic material 11 is poured into the space between the bulb and the collar onto the said layer 10' up to a height as indicated by 11'. The synthetic material is thus sucked up in the sand layer and reaches the lower edge of the collar after 6 to 7 minutes. The higher sand layers at the corners are also completely impregnated with synthetic material after approximately 9 minutes, the air thus being able to escape at the corners. If desired, the collar 4 may be provided at its underside with a few apertures 15 to facilitate the pushing out of air and to permit any excessive synthetic material to flow away. In fact, it is not desirable that a thick layer of pure synthetic material remains above this layer since difficulties could arise therefrom upon cooling to very low temperatures ($-40°$). If the liquid filler is correctly proportioned, however, it may be ensured that the sand layer is completely impregnated without a thick layer of synthetic material remaining on the sand layer.

The sand must be quite dry and preferably consists of circular grains of $200\mu$ to $400\mu$ in diameter. Although it is also possible to use ground hard materials, such as ground glass, ground aluminum or the like, sharply pointed grains are liable to cause cracks in the filling layer due to carving action. This is avoided when using rounder grains.

The introduction of the granular material may also be effected by pouring and enhanced by vibrating whereby at the same time the degree of filling is increased. It may also be advantageous previously to heat the granular material so that the pourable filler becomes thinner and the sucking up process is enhanced while also speeding up the process of hardening of the synthetic material.

It has been that the filling of synthetic material is strengthened by the granular hard material to an extent such that covering of the cone with a layer of synthetic material and glass tissue is no longer required. In addition, it is not necessary to fill the space between the collar and the bulb up to the upper edge of the collar which extends approximately to the sealing edge 12. A filling up to the mold division line 13 has usually been found to provide already sufficient strength.

The air present between the sand particles is found to be pushed by the synthetic material in front of it so that occlusions of air do not occur.

What is claimed is:

1. A method of manufacturing a non-implosive cathode ray tube comprising a glass envelope having a window portion, a cone portion sealed to said window portion, and a neck portion comprising the steps of positioning an annular rigid member around the juncture of the cone portion and the window portion, said rigid member being spaced from said envelope, introducing a granular material into the space between the rigid member and the envelope, and impregnating said granular material with a liquid hardenable binder material which serves as a binder for said granular material and secures said rigid member to said envelope, said rigid member having apertures therein on the side adjacent the window portion whereby excess liquid binder material can flow away.

2. A method as claimed in claim 1 in which the granular substance is sand.

3. A method as claimed in claim 2, characterized in that the sand has a grain size between $200\mu$ and $400\mu$.

References Cited

UNITED STATES PATENTS

| 2,781,554 | 2/1957 | Robinson | 264—261 |
| 2,948,930 | 8/1960 | Herbst | 264—128 XR |

ROBERT F. WHITE, *Primary Examiner.*

L. S. SQUIRES, T. J. CARVIS, *Assistant Examiners.*